(12) United States Patent
Kun et al.

(10) Patent No.: US 12,199,458 B2
(45) Date of Patent: *Jan. 14, 2025

(54) MULTI-OUTPUT SWITCHED-MODE POWER SUPPLY FOR MULTI-CELL-IN-SERIES BATTERY CHARGING

(71) Applicant: QUALCOMM Incorporated, San Diego, CA (US)

(72) Inventors: Cheong Kun, San Diego, CA (US); Guoyong Guo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 17/448,306

(22) Filed: Sep. 21, 2021

(65) Prior Publication Data

US 2022/0231518 A1    Jul. 21, 2022

Related U.S. Application Data

(60) Provisional application No. 63/139,257, filed on Jan. 19, 2021.

(51) Int. Cl.
*H02J 7/00* (2006.01)
(52) U.S. Cl.
CPC ...... *H02J 7/0019* (2013.01); *H02J 7/007182* (2020.01); *H02J 2207/20* (2020.01); *H02J 2207/30* (2020.01)
(58) Field of Classification Search
None
See application file for complete search history.

(56) References Cited

U.S. PATENT DOCUMENTS 10,277,052 B2    4/2019  Li
10,686,367 B1 *  6/2020  Low .................. H02M 1/36
(Continued)

FOREIGN PATENT DOCUMENTS

WO    2016176032 A1    11/2016

OTHER PUBLICATIONS

International Search Report and Written Opinion—PCT/US2022/070182—ISA/EPO—Apr. 8, 2022.
(Continued)

*Primary Examiner* — Arun C Williams
(74) *Attorney, Agent, or Firm* — Patterson+ Sheridan, L.L.P.

(57) ABSTRACT

Methods and apparatus for converting power using a multi-output switched-mode power supply (SMPS) coupled to a multi-cell-in-series battery, such as charging a two-cell-in-series (2S) battery using a dual-output three-level buck converter coupled thereto, or using a multi-input SMPS circuit receiving power from a multi-cell-in-series battery. One example power supply circuit generally includes a switched-mode power supply circuit having an input node and an output node, a battery comprising multiple cells connected in series, a charge pump circuit having a first terminal and a second terminal, the second terminal of the charge pump circuit being coupled to the battery, a first switch coupled between the output node of the switched-mode power supply circuit and the first terminal of the charge pump circuit, and a second switch coupled between the output node of the switched-mode power supply circuit and the second terminal of the charge pump circuit.

24 Claims, 8 Drawing Sheets

(56) References Cited

U.S. PATENT DOCUMENTS

| | | | |
|---|---|---|---|
| 11,502,599 B2* | 11/2022 | Yen | H02M 3/07 |
| 11,545,897 B2* | 1/2023 | Yen | H02J 7/007 |
| 2001/0024113 A1* | 9/2001 | Goyhenetche | H02M 3/33571 |
| | | | 323/282 |
| 2012/0212201 A1* | 8/2012 | Lee | H02M 3/073 |
| | | | 323/282 |
| 2012/0236444 A1* | 9/2012 | Srivastava | H03F 1/52 |
| | | | 361/56 |
| 2015/0364928 A1* | 12/2015 | Yen | H02M 3/07 |
| | | | 320/108 |
| 2016/0332598 A1* | 11/2016 | Ghabra | B60R 25/30 |
| 2018/0166902 A1 | 6/2018 | Huang et al. | |
| 2020/0403514 A1 | 12/2020 | Yu | |

OTHER PUBLICATIONS

Tomar P. S., et al., "An Improved Current-Fed Bidirectional DC-DC Converter for Reconfigurable Split Battery in EVs", IEEE Transactions on Industry Applications, IEEE Service Center, Piscataway, NJ, US, vol. 56, No. 6, Sep. 14, 2020 (Sep. 14, 2020), pp. 6957-6967, XP011817766, ISSN:0093-9994, DOI: 10.1109/TIA. 2020.3024165, [retrieved on Nov. 1, 2020], Abstract, figures 2-4 first full paragraph on p. 3.

* cited by examiner

MULTI-OUTPUT SWITCHED-MODE POWER SUPPLY FOR MULTI-CELL-IN-SERIES BATTERY CHARGING

CROSS-REFERENCE TO RELATED APPLICATION(S)

This application claims the benefit of priority to U.S. Provisional Application No. 63/139,257, entitled "Multi-Output Switched-Mode Power Supply for Multi-Cell-in-Series Battery Charging" and filed Jan. 19, 2021, which is expressly incorporated by reference herein in its entirety as if fully set forth below and for all applicable purposes.

TECHNICAL FIELD

Certain aspects of the present disclosure generally relate to electronic circuits and, more particularly, to methods and apparatus for converting power using a multi-output switched-mode power supply (SMPS) coupled to a multi-cell-in-series battery.

BACKGROUND

A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

A charge pump is a type of SMPS typically comprising at least one switching device to control the connection of a supply voltage across a load through a capacitor. In a voltage doubler (also referred to as a "multiply-by-two (X2) charge pump"), for example, the capacitor of the charge pump circuit may initially be connected across the supply, charging the capacitor to the supply voltage. The charge pump circuit may then be reconfigured to connect the capacitor in series with the supply and the load, doubling the voltage across the load. This two-stage cycle is repeated at the switching frequency for the charge pump. Charge pumps may be used to multiply or divide voltages by integer or fractional amounts, depending on the circuit topology.

Power management integrated circuits (power management ICs or PMICs) are used for managing the power scheme of a host system and may include and/or control one or more voltage regulators (e.g., buck converters or charge pumps). A PMIC may be used in battery-operated devices, such as mobile phones, tablets, laptops, wearables, etc., to control the flow and direction of electrical power in the devices. The PMIC may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features are discussed briefly below. After considering this discussion, and particularly after reading the section entitled "Detailed Description," one will understand how the features of this disclosure provide the advantages described herein.

Certain aspects of the present disclosure generally relate to a multi-output switched-mode power supply (SMPS) circuit coupled to a multi-cell-in-series battery, such as a dual-output three-level buck converter coupled to a two-cell-in-series (2S) battery. Such a circuit may alternatively function in reverse as a multi-input SMPS circuit receiving power from a multi-cell-in-series battery, such as a 2S battery coupled to a dual-input two-level boost converter.

Certain aspects of the present disclosure are directed to a power supply circuit. The power supply circuit generally includes a switched-mode power supply circuit having an input node and an output node, a battery comprising multiple cells connected in series, a charge pump circuit having a first terminal and a second terminal, the second terminal of the charge pump circuit being coupled to the battery, a first switch coupled between the output node of the switched-mode power supply circuit and the first terminal of the charge pump circuit, and a second switch coupled between the output node of the switched-mode power supply circuit and the second terminal of the charge pump circuit.

Certain aspects of the present disclosure provide a power management integrated circuit (PMIC) comprising at least a portion of the power supply circuit described above.

Certain aspects of the present disclosure provide a battery charging circuit comprising the power supply circuit described above.

Certain aspects of the present disclosure are directed to a power supply circuit. The power supply circuit generally includes a switched-mode power supply circuit having an input node and an output node, a charge pump circuit having a first terminal and a second terminal, a first switch coupled between the output node of the switched-mode power supply circuit and the first terminal of the charge pump circuit, and a second switch coupled between the output node of the switched-mode power supply circuit and the second terminal of the charge pump circuit.

Certain aspects of the present disclosure are directed to a method of supply power. The method generally includes operating a switched-mode power supply circuit and selectively routing a current through a first switch coupled between a first node of the switched-mode power supply circuit and a first terminal of a charge pump circuit or through a second switch coupled between the first node of the switched-mode power supply circuit and a second terminal of the charge pump circuit.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
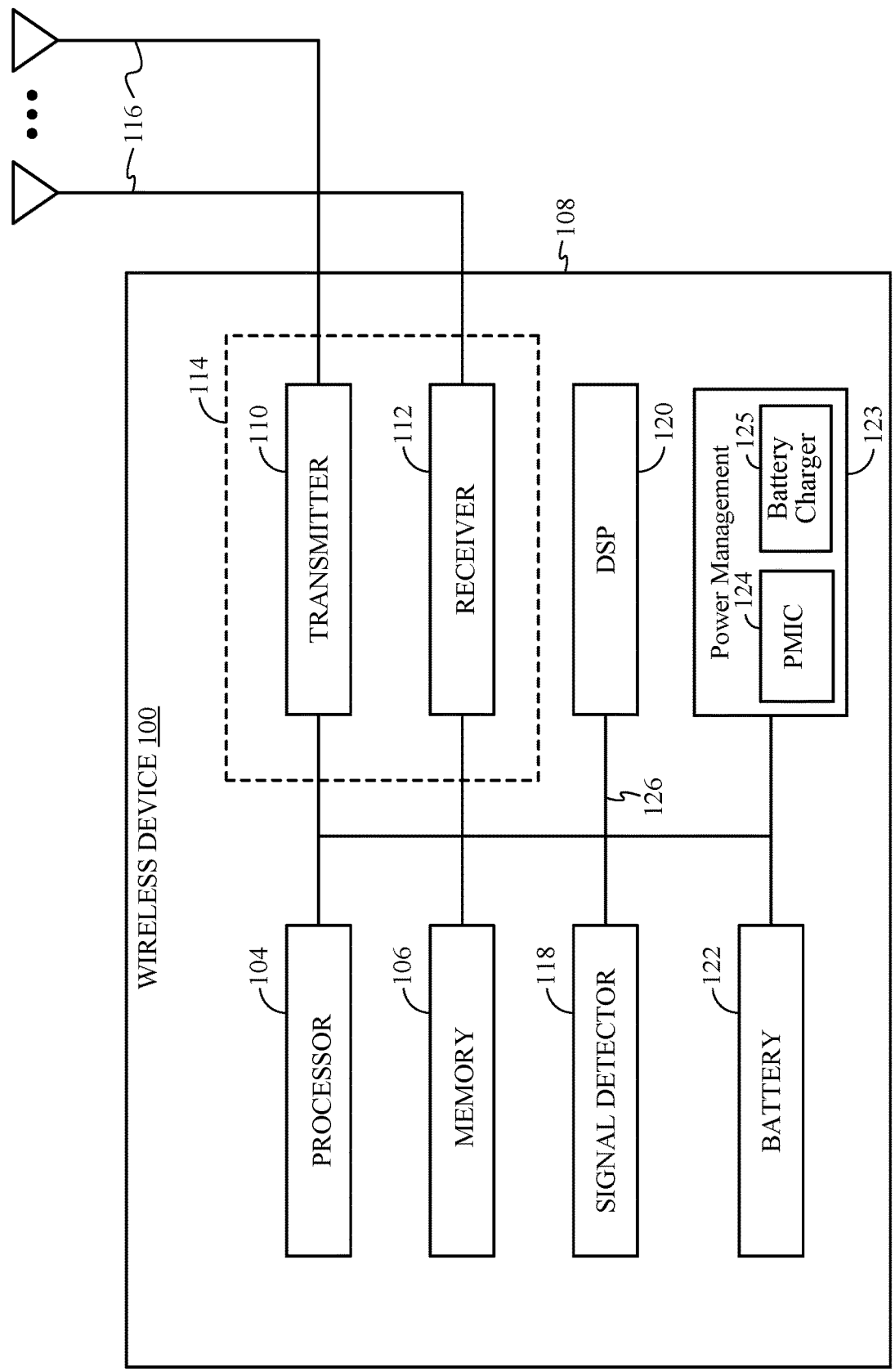
FIG. 1 is a block diagram of an example device comprising a power management system that includes a switched-mode power supply (SMPS) circuit and a battery charging circuit, in which aspects of the present disclosure may be practiced.

Certain aspects of the present disclosure provide techniques and apparatus for converting power using a multi-output switched-mode power supply (SMPS) coupled to a multi-cell-in-series battery, such as charging a two-cell-in-series (2S) battery using a dual-output three-level buck converter coupled thereto. Such a power supply circuit may alternatively function in reverse as a multi-input SMPS circuit receiving power from a multi-cell-in-series battery, such as a dual-input two-level boost converter charging another device from a 2S battery.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDAs), and the like.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when another power source—such as a wall adapter or a wireless power charger—is unavailable). The battery 122 may comprise a single cell or multiple cells connected in series. The device 100 may also include a power management system 123 for managing the power from the battery 122, a wall adapter, and/or a wireless power charger to the various components of the device 100. The power management system 123 may perform a variety of functions for the device such as DC-to-DC conversion, battery charging, power-source selection, voltage scaling, power sequencing, etc. In certain aspects, the power management system 123 may include a power management integrated circuit (power management IC or PMIC) 124 and one or more power supply circuits, such as a battery charger 125, which may be controlled by the PMIC. For certain aspects, at least a portion of one or more of the power supply circuits may be integrated in the PMIC 124. The PMIC 124 and/or the one or more power supply circuits may include at least a portion of a switched-mode power supply (SMPS) circuit, which may be implemented by any of various suitable SMPS circuit topologies, such as a buck converter, a buck-boost converter, a three-level buck converter, or a charge pump, such as a multiply-by-two (X2) or multiply-by-three (X3) charge pump.

The various components of the device 100 may be coupled together by a bus system 126, which may include a power bus, a control signal bus, and/or a status signal bus in addition to a data bus.

Example Multi-Cell-In-Series Battery Charging Schemes

Battery charging systems (e.g., the battery charger 125 of FIG. 1) are trending towards higher charging current, which leads to the desire for higher efficiency converters that can operate over a wider battery voltage range. To reduce thermal issues and/or conserve power, it may be desirable to operate such battery charging systems with higher efficiency.

In one example parallel charging solution, the master charger is implemented based on a buck converter topology. The master charger is capable of charging a battery (e.g., the battery 122) and providing power by itself or may be paralleled with one or more slave chargers. Each of the slave chargers may be implemented, for example, as a switched-capacitor converter (e.g., a divide-by-two (Div2) charge pump) or a switched-mode power supply (SMPS) topology using an inductor (e.g., a buck converter). Charge pump converters may provide a more efficient alternative than buck converters.

Compared with single-cell (1S) battery charging, charging a two-cell-in-series (2S) battery stores two times the power in the battery with the same charging current, thereby offering double the charging rate. A power supply system for charging a 2S battery may include, for example, a buck converter followed by a boost converter, or a buck converter followed by a charge pump capable of voltage multiplying by two (X2). An X2 charge pump may also be capable of dividing by two (Div2) when discharging the 2S battery in the opposite direction (i.e., in reverse). Hence, a battery charging circuit with this multiply-by-two and divide-by-two charge pump capability may be referred to as an "X2/D2" circuit.

Figure 2A:
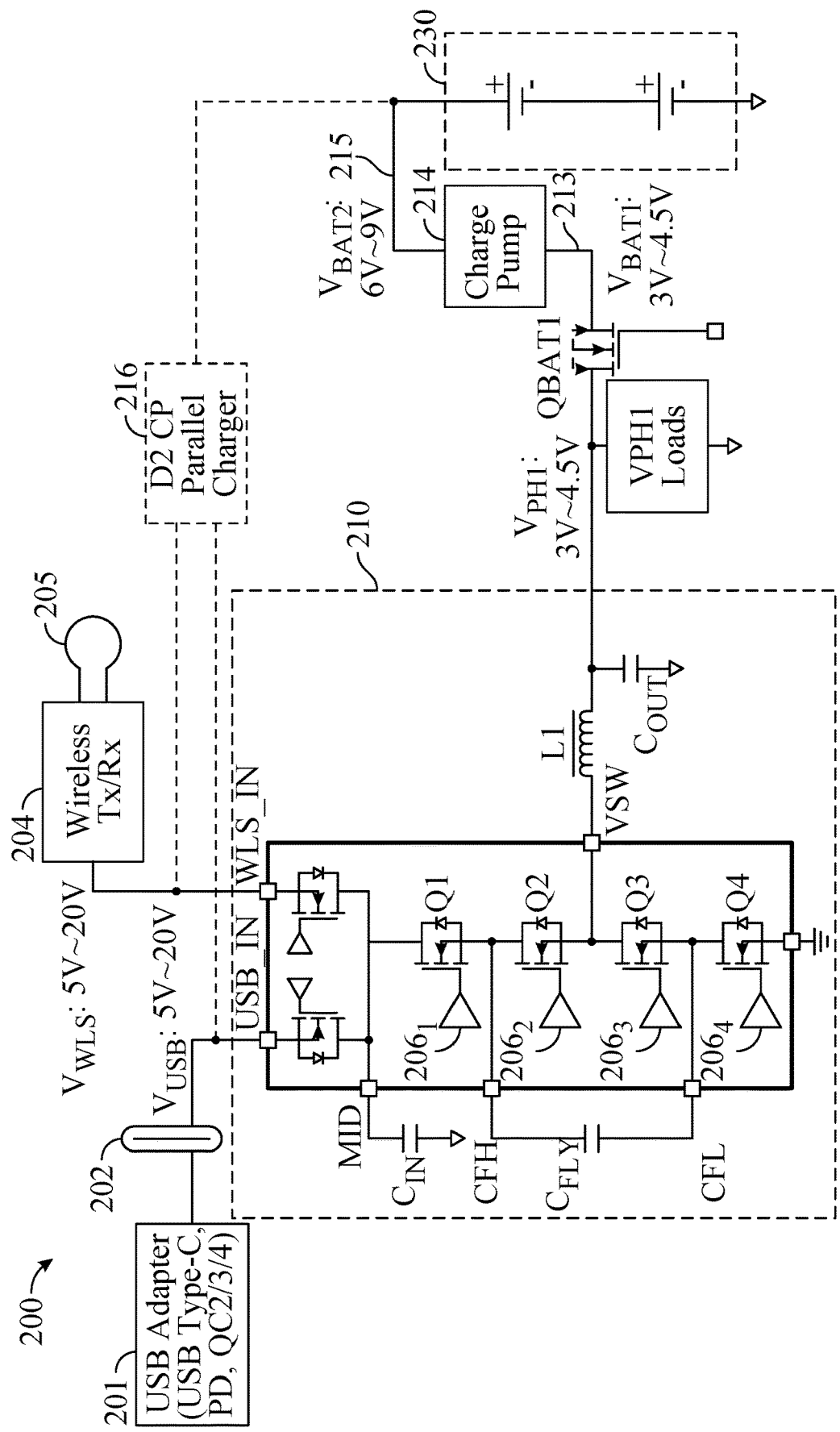
FIG. 2A is a block diagram of an example power supply circuit with a single-output SMPS and a charge pump for charging a two-cell-in-series (2S) battery.

FIG. 2A is a block diagram of an example power supply circuit 200 with a single-output SMPS 210 and a charge pump 214 (e.g., an X2/D2 charge pump) for charging a multi-cell battery 230 (e.g., a 2S battery). While the charge pump 214 is generally described herein with the example of an X2/D2 charge pump, it is to be understood that the charge pump may be implemented with other configurations, such as an X3/D3 charge pump. The power source for the charge pump 214 may come from a first power supply node 213 (labeled "$V_{BAT1}$"), which may come from the SMPS 210 (e.g., in a power management circuit, such as the PMIC 124), or from a second power supply node 215 (labeled "$V_{BAT2}$"), which may come from the battery 230. As illustrated in FIG. 2A, the battery 230 may be charged to have $V_{BAT2}$=6 to 9 V from one of multiple potential power sources, such as a wall adapter or other power cable (e.g., a Universal Serial Bus (USB) adapter 201) connected via port 202 or a wireless power charger (not shown), having an example power supply range of 5 to 20 V, inductively coupled to a wireless power loop 205 connected to a wireless power transceiver 204. For example, the USB source may supply a voltage $V_{USB}$ of 5 V with a USB standard downstream port, charging downstream port, or dedicated charging port (SDP/CDP/DCP) or USB Type-C, 9 to 12 V with Quick Charge (QC) 2.0/3.0/4.0, or 15 to 20 V with a USB power delivery (PD) adapter. The wireless (WLS) source in transmit mode (Tx) may supply a voltage $V_{WLS}$ of 5 V with Qi Baseline Power Profile (BPP), 15 V with Qi Extended Power Profile (EPP), or 20 V with other modes, for instance.

The SMPS 210 may include any of various suitable switching converters, such as a two-level buck converter or a three-level buck converter. To implement a three-level buck converter topology, as shown in FIG. 2A, the SMPS 210 may include a first transistor Q1, a second transistor Q2, a third transistor Q3, a fourth transistor Q4, a flying capacitive element $C_{FLY}$, an inductive element L1, and a shunt capacitive element $C_{OUT}$. Transistor Q2 may be coupled to transistor Q1 via a first node (labeled "CFH" for flying capacitor high node), transistor Q3 may be coupled to transistor Q2 via a second node (labeled "VSW" for voltage switching node), and transistor Q4 may be coupled to transistor Q3 via a third node (labeled "CFL" for flying capacitor low node). For certain aspects, the transistors Q1-Q4 may be implemented as n-type metal-oxide-semiconductor (NMOS) transistors, as illustrated in FIG. 2A. In this case, the drain of transistor Q2 may be coupled to the source of transistor Q1, the drain of transistor Q3 may be coupled to the source of transistor Q2, and the drain of transistor Q4 may be coupled to the source of transistor Q3. The source of transistor Q4 may be coupled to a reference potential node (e.g., electric ground) for the power supply circuit 200. The flying capacitive element $C_{FLY}$ may have a first terminal coupled to the first node and a second terminal coupled to the third node. The inductive element L1 may have a first terminal coupled to the second node and a second terminal coupled to an output voltage node (labeled "$V_{PH1}$").

Certain aspects may include an optional transistor (labeled "QBAT1") disposed between the $V_{PH1}$ node and the first power supply node ($V_{BAT1}$). The transistor QBAT1 may be implemented by an NMOS transistor, as shown, and may serve to control current flow and/or protect one or more elements in the power supply circuit 200.

Control logic (not shown, but may be integrated in a PMIC for certain aspects) may control operation of the power supply circuit 200. For example, the control logic may control operation of the transistors Q1-Q4 via output signals to the inputs of respective gate drivers $206_1$-$206_4$ (collectively referred to as "gate drivers 206"). The outputs of the gate drivers 206 are coupled to respective gates of transistors Q1-Q4. During operation of the power supply circuit 200, the control logic may cycle through four different phases, which may differ depending on whether the duty cycle is less than 50% or greater than 50%.

Operation of the three-level buck converter with a duty cycle of less than 50% is described first. In a first phase (referred to as a "charging phase"), transistors Q1 and Q3 are activated, and transistors Q2 and Q4 are deactivated, to charge the flying capacitive element $C_{FLY}$ and to energize the inductive element L1. In a second phase (called a "holding phase"), transistor Q1 is deactivated, and transistor Q4 is activated, such that the VSW node is connected to the reference potential node, the flying capacitive element $C_{FLY}$ is disconnected (e.g., one of the $C_{FLY}$ terminals is floating), and the inductive element L1 is deenergized. In a third phase (referred to as a "discharging phase"), transistors Q2 and Q4 are activated, and transistor Q3 is deactivated, to discharge the flying capacitive element $C_{FLY}$ and to energize the inductive element L1. In a fourth phase (also referred to as a "holding phase"), transistor Q3 is activated, and transistor Q2 is deactivated, such that the flying capacitive element $C_{FLY}$ is disconnected and the inductive element L1 is deenergized.

Operation of the three-level buck converter with a duty cycle greater than 50% is similar in the first and third phases, with the same transistor configurations. However, in the second phase (called a "holding phase") following the first phase, transistor Q3 is deactivated, and transistor Q2 is activated, such that the VSW node is coupled to an input voltage node (labeled "MID") of the SMPS 210, the flying capacitive element $C_{FLY}$ is disconnected, and the inductive element L1 is energized. Similarly in the fourth phase (also referred to as a "holding phase"), transistor Q1 is activated, and transistor Q4 is deactivated, such that the flying capacitive element $C_{FLY}$ is disconnected and the inductive element L1 is energized.

During battery charging, the SMPS 210 may convert the input voltage of 5 to 20 V power at the input node to a range of 3 to 4.5 V, for example, at the SMPS output node (labeled "$V_{PH1}$"). The charge pump 214 may then double this voltage to a range of 6 to 9 V (for an X2/D2 charge pump) to charge the battery 230. During battery discharging (e.g., when there is no external power adapter or wireless power input available, such as when the battery 122 powers the device 100), the SMPS 210 may be disabled, and the charge pump 214 may operate in Div2 mode to provide $V_{PH1}$=3 to 4.5 V for system loads (labeled "VPH1 Loads"). For certain aspects, the SMPS 210 may also operate in reverse as a (two-level) boost converter to supply power from the battery 230 to the USB port 202 and/or wireless power loop 205 in a reverse charging mode (e.g., supplying 5 V to $V_{USB}$ in USB On-the-Go (OTG) or 10 V to $V_{WLS}$ for reverse WLS charging).

Figure 3:
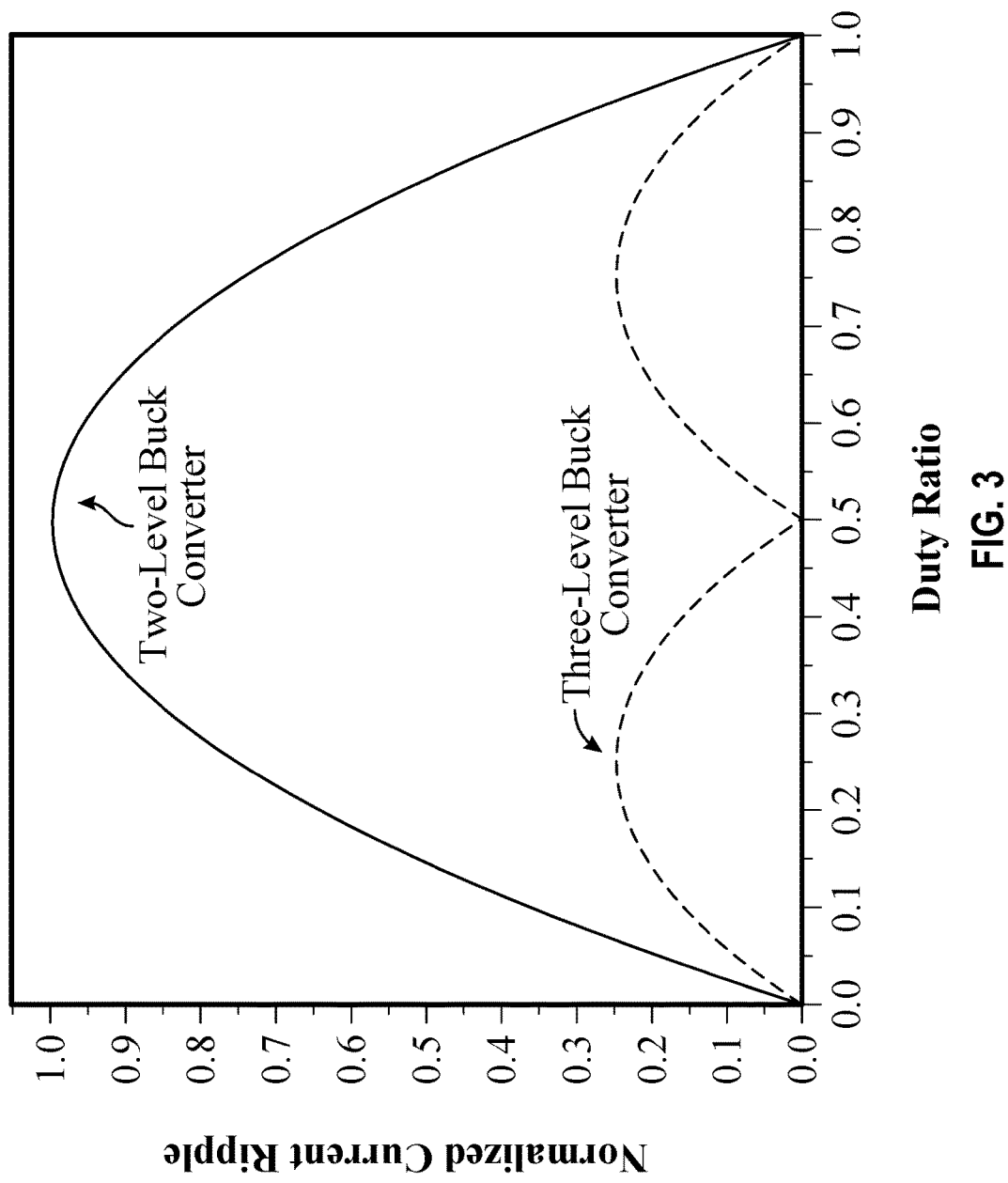
FIG. 3 is an example graph of normalized current ripple versus duty cycle for a two-level buck converter and for a three-level buck converter.

This power supply circuit architecture in FIG. 2A offers flexibility for 1S battery charging (e.g., without or disabling the charge pump 214) or for 2S battery charging (e.g., with or enabling the X2/D2 charge pump). Compared to a two-level buck converter, implementing the SMPS 210 as a three-level buck converter halves the amplitude of the switching node (labeled "VSW") and doubles the effective switching frequency, which allows for using an inductor with a smaller inductance, and thus offers lower DC resistance (DCR) and higher efficiency. This architecture offers good efficiency with input voltages (at the MID node) of 5 to 9 V for an output voltage $V_{PH1}$ of 3 to 4.5 V (at or near 50% duty cycle), but may have lower efficiency with input voltages of 15 to 20 V. For example, with an input voltage of 15 to 20 V at the MID node and an output voltage at the $V_{PH1}$ node of 4 to 4.5 V, a three-level buck converter may operate with a 20-30% duty ratio, which results in higher inductor current ripple (as shown in the graph 300 of FIG. 3, compared to a 50% duty cycle) and lower efficiency. There may also be a 1 to 2% efficiency loss through the charge pump 214 when operating in X2 mode.

For certain aspects, an optional parallel charger 216 (e.g., a Div2 charge pump) may be enabled to provide power from the USB input node (labeled "USB_IN") at $V_{USB}$ or the wireless power input node (labeled "WLS_IN") at $V_{WLS}$ to the second power supply node 215 at $V_{BAT2}$ in certain cases (e.g., with input voltages of 15 to 20 V). For some cases, however, the efficiency may be unacceptably low when no such parallel charger 216 is present.

For these reasons, the efficiency of charging a multi-cell-in-series battery with the power supply circuit 200 of FIG. 2A may not be as ideal as possible. Accordingly, certain aspects of the present disclosure provide techniques and apparatus for charging a multi-cell-in-series battery with higher efficiency.

Figure 2B:
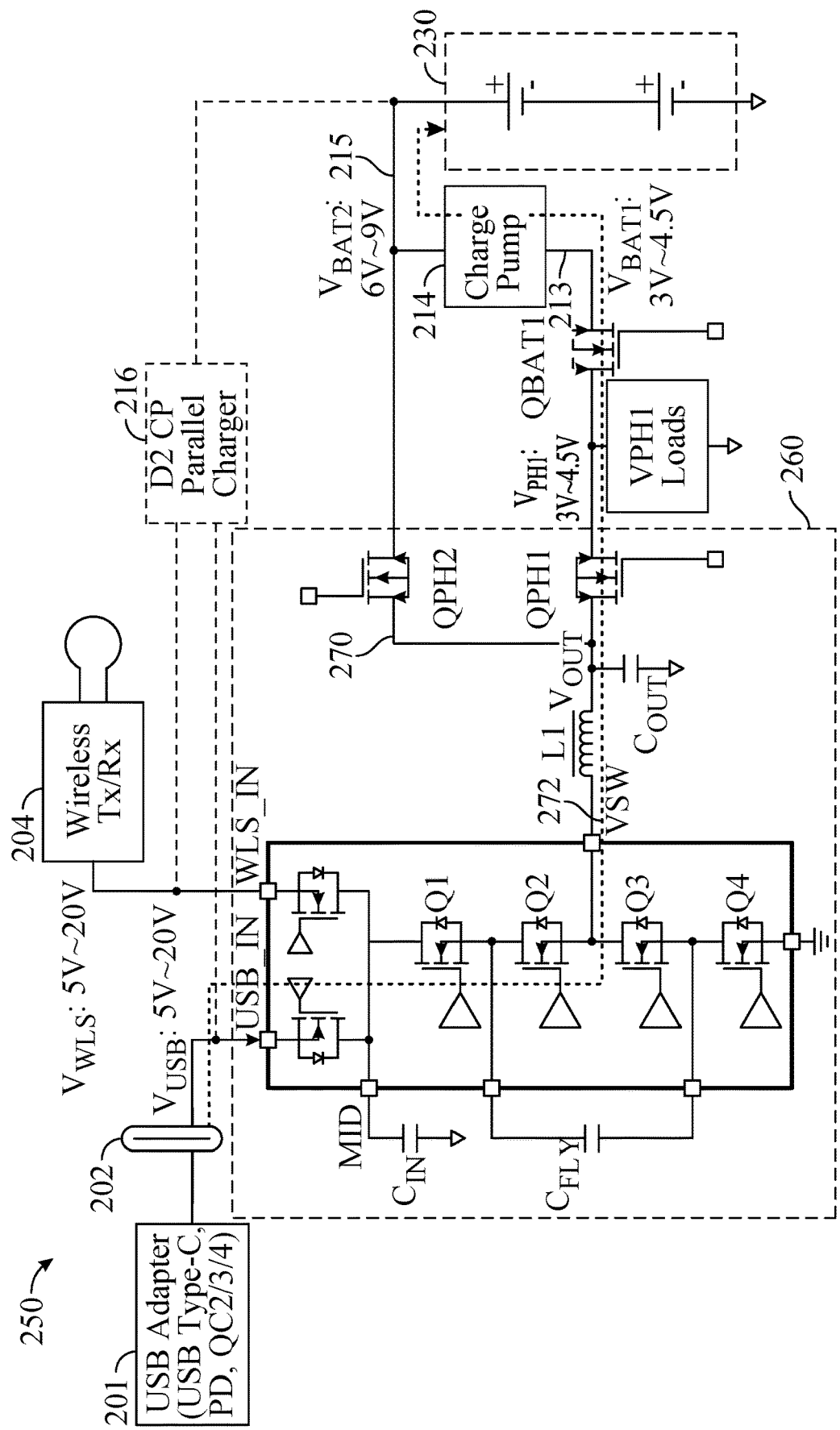
FIGS. 2B and 2C are block diagrams of an example power supply circuit with a dual-output SMPS and a charge pump for charging a 2S battery, illustrating different power paths, in accordance with certain aspects of the present disclosure.

FIG. 2B is a block diagram of an example power supply circuit 250 with a dual-output SMPS 260 and the charge pump 214 for charging the battery 230. The power supply circuit 250 adds two switches (which may be implemented by transistors QPH1 and QPH2 as depicted) to the power supply circuit 200 of FIG. 2A. One path through a first switch (e.g., through transistor QPH1) provides a first output of the dual-output SMPS 260, which is similar to the output of the SMPS 210 of FIG. 2A. The other path through a second switch (e.g., through transistor QPH2) provides a second output of the SMPS 260, which can selectively connect the output node 270 (labeled "$V_{OUT}$") to the second power supply node 215 with $V_{BAT2}$, bypassing the charge pump 214.

When $V_{MID}$<$V_{BAT2}$ (e.g., with 5 V USB or WLS BPP Tx), the first switch (transistor QPH1) is closed, and the second switch (transistor QPH2) is open. In this case, the SMPS 260 is operated in a forward mode to convert the input voltage $V_{MID}$ down to a lower voltage $V_{BAT1}$ (e.g., 3 to 4.5 V) at the $V_{PH1}$ node and at the first power supply node 213, and the charge pump 214 is operated in X2 mode to double the voltage $V_{BAT1}$ to a higher voltage $V_{BAT2}$ (e.g., 6 to 9 V) at the second power supply node 215. Thus, in this case, current flows in a first path 272 from the input node to the output node 270, through the first switch (transistor QPH1) and the charge pump 214 to charge the battery 230, as illustrated in FIG. 2B.

Figure 2C:
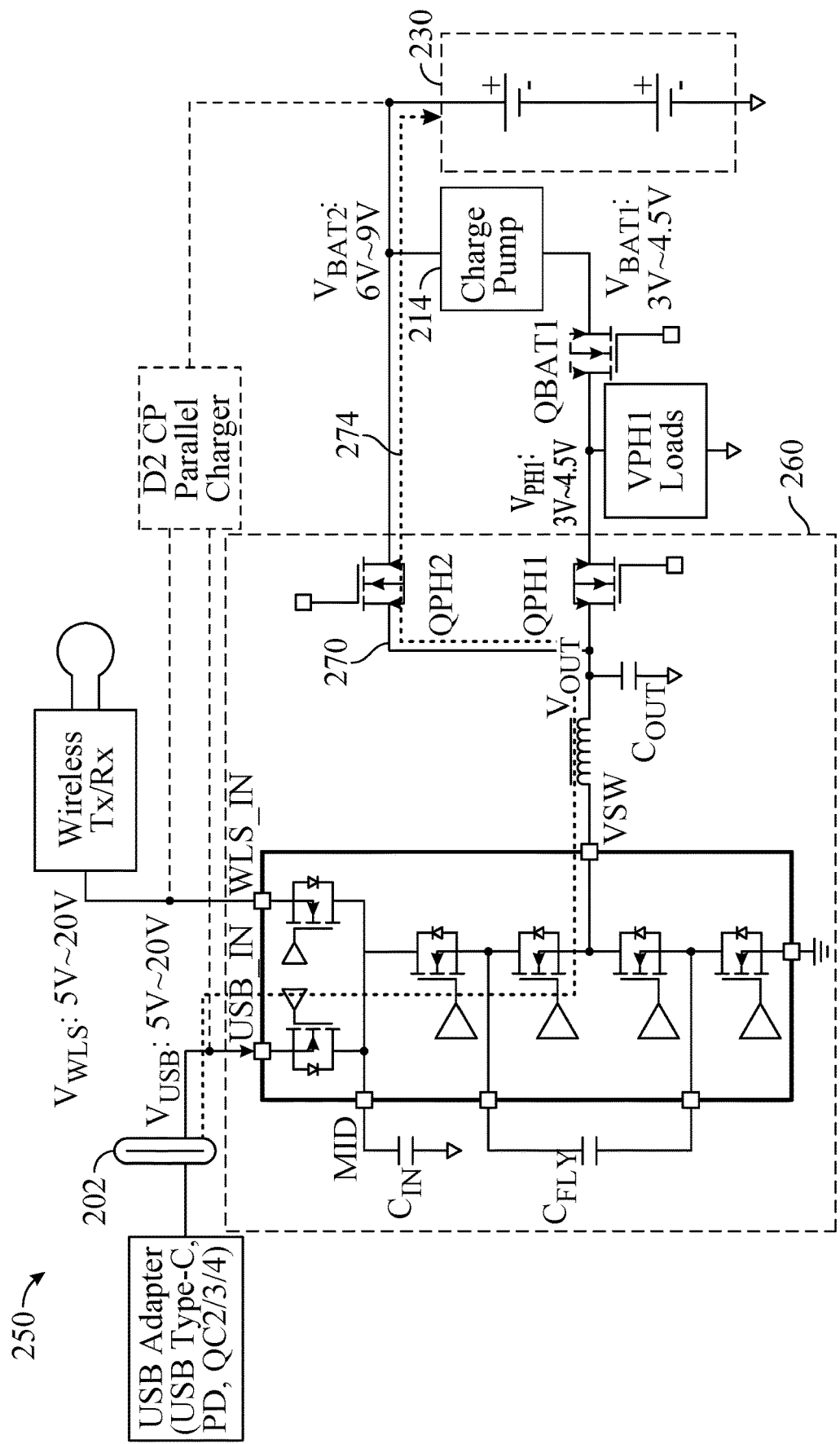

When $V_{MID}$>$V_{BAT2}$ (e.g., with QC2/3/4, USB PD, or WLS EPP/HPP Tx), the first switch (transistor QPH1) is open, and the second switch (transistor QPH2) is closed to supply power from the SMPS 260 to the battery 230 (e.g., $V_{BAT2}$=6 to 9 V) in another forward mode, effectively bypassing the charge pump 214. Thus, in this scenario as portrayed in FIG. 2C, current flows in a second path 274 from the input node to the output node 270 and through the second switch (transistor QPH2) to charge the battery 230. In this case, instead of charging the battery 230, the charge pump 214 may be operated in a divisional mode (e.g., a D2 mode) to supply power to the system loads (e.g., $V_{PH1}$=3 to 4.5 V).

The power supply circuit 250 of FIG. 2B can achieve significantly higher efficiency than the power supply circuit 200 of FIG. 2A with higher input voltages. This is because the SMPS 260 can be operated with a high duty ratio close to 1.0 (e.g., $V_{MID}$=9 V and $V_{OUT}$=8 to 9 V at the inductor) or at a 0.5 duty ratio (e.g., $V_{MID}$=15 to 20 V and $V_{OUT}$=8 to 9 V), both of which result in low inductor current ripple (as shown in the graph 300 of FIG. 3) and thus low AC loss. Furthermore, in the case of FIG. 2C with the first switch open and the second switch closed, the charge pump 214 is effectively bypassed, such that there is no 1 to 2% efficiency loss through the charge pump in charging the battery.

Figure 2D:
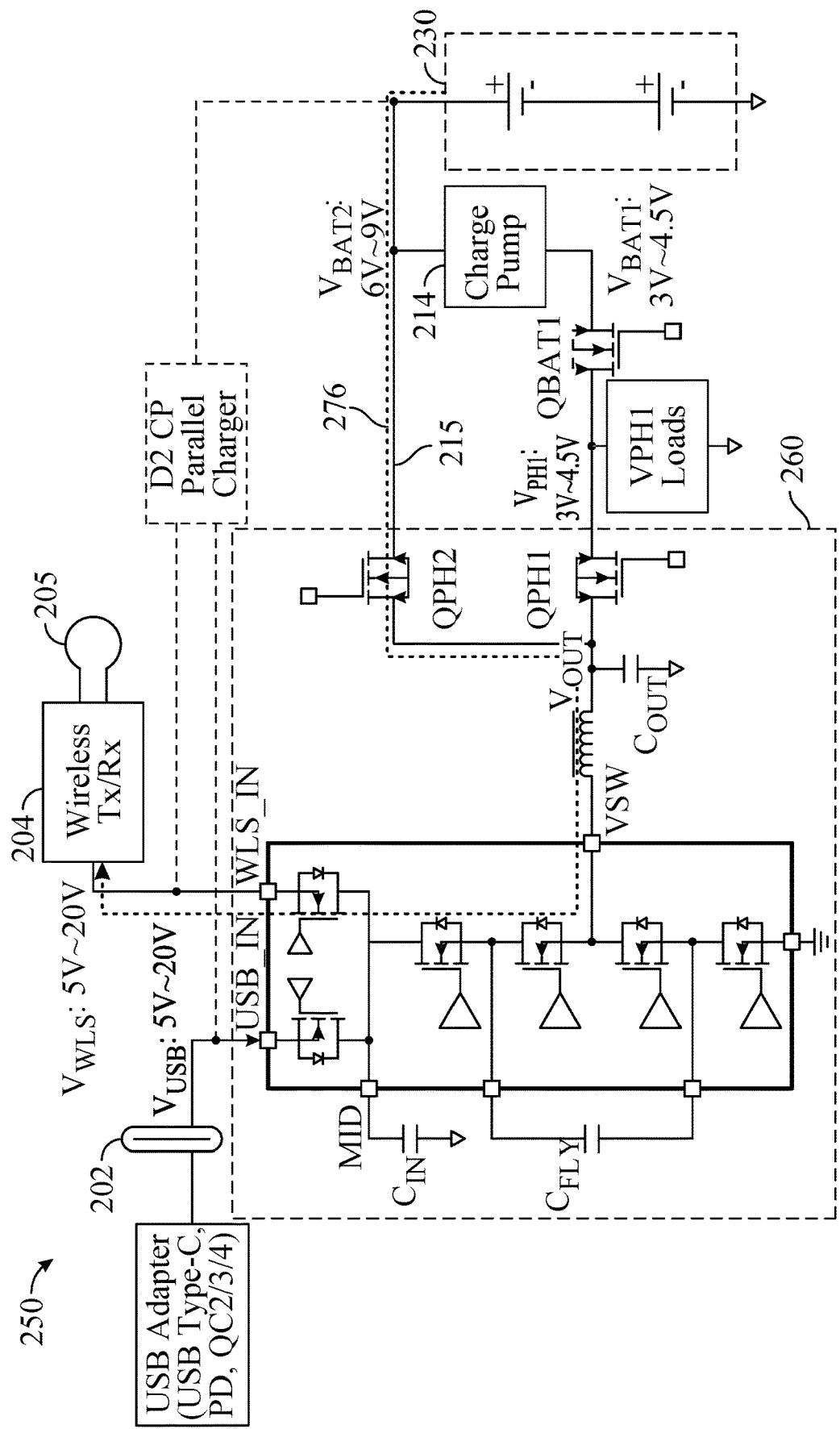
FIGS. 2D and 2E are block diagrams of the example power supply circuit of FIGS. 2B and 2C operating in reverse as a dual-input SMPS receiving power from the 2S battery with different power paths, in accordance with certain aspects of the present disclosure.
Figure 2E:
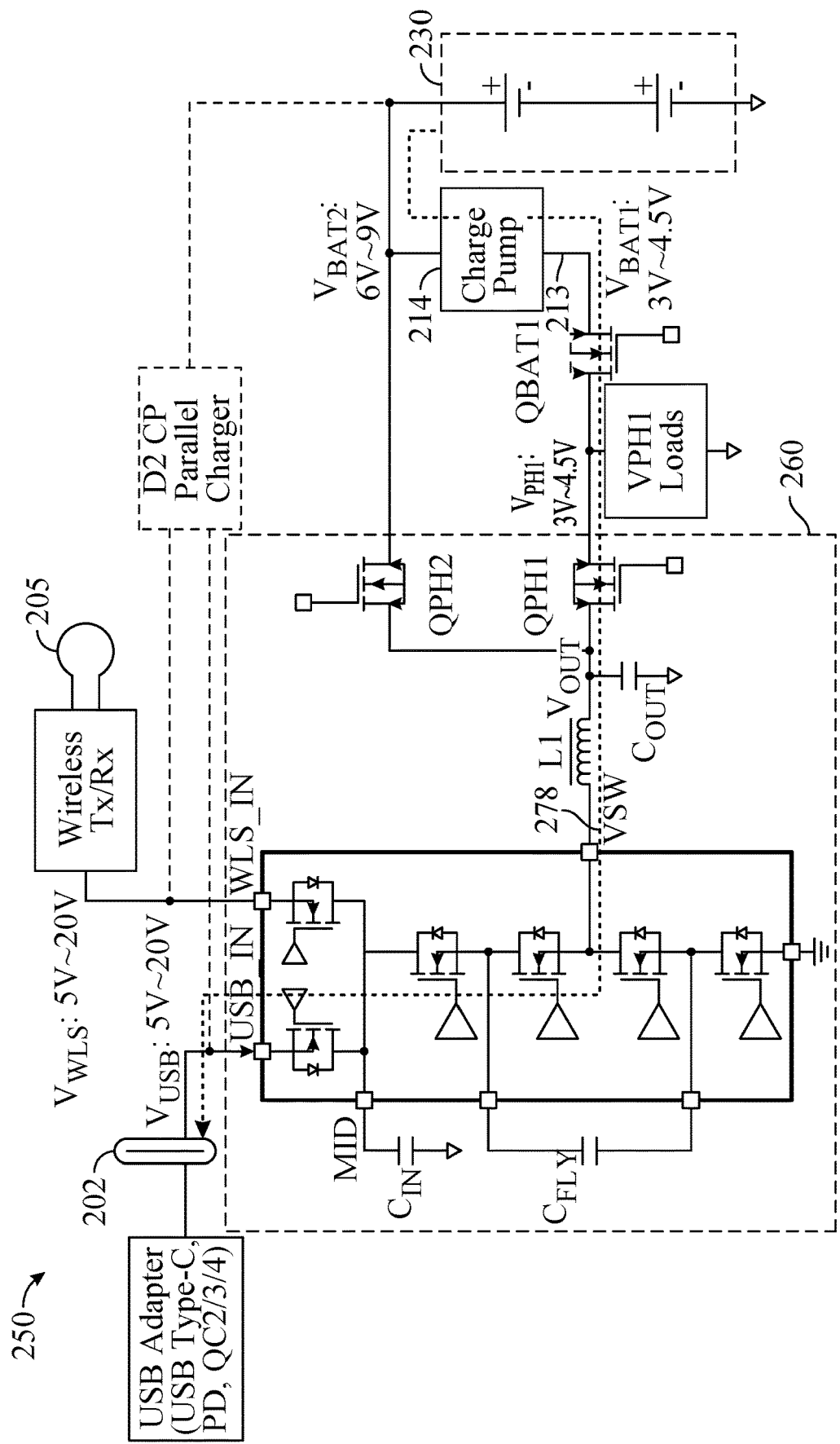

Moreover, the SMPS 260 can operate in a reverse mode as a dual-input (two-level) boost converter. For example, as illustrated in FIG. 2D, current can be routed from the battery 230 via a third path 276 through the second switch (e.g., transistor QPH2) such that the voltage $V_{BAT2}$ at the second power supply node 215 can be boosted by the SMPS 260 to supply the MID node for reverse charging of devices connected to the USB port 202 or inductively coupled to the wireless power loop 205. For instance, the voltage $V_{BAT2}$ may be boosted to $V_{WLS}$=10 V for reverse WLS charging. Alternatively, as illustrated in FIG. 2E, current can be routed from the battery 230 via a fourth path 278 through the first switch (e.g., transistor QPH1) such that the voltage $V_{BAT1}$ at the first power supply node 213 can be boosted by the SMPS 260 to supply the MID node for reverse charging of devices. For example, the voltage $V_{BAT1}$ may be boosted to $V_{USB}$=5 V for reverse charging of USB devices (e.g., according to USB OTG). When boosting $V_{BAT2}$ through the second switch, the efficiency can be greater than when boosting $V_{BAT1}$ through the first switch, according to the conversion ratios (and associated inductor current ripple) of the examples provided herein.

As shown, the example power supply circuit 250 is capable of charging a 2S battery, although it is to be understood that the scope of the present disclosure includes batteries with more than two cells (e.g., three-cell-in-series (3S), four-cell-in-series (4S) batteries, or n-cell-in-series, where n is an integer greater than 1). Furthermore, although the power supply circuit 250 has a dual-output SMPS 260 with a charge pump 214 between the two different outputs (e.g., between $V_{BAT1}$ and $V_{BAT2}$), it is to be understood that the scope of the present disclosure includes a multi-output SMPS (e.g., a three-output SMPS for a 3S battery) with multiple switches for selecting between the different outputs (e.g., $V_{BAT1}$, $V_{BAT2}$, and $V_{BAT3}$ for a 3S battery) and a charge pump between each pair of outputs (e.g., a X1.5/D1.5 charge pump between $V_{BAT2}$ and $V_{BAT3}$ for a 3S battery).

Example Operations

Figure 4:
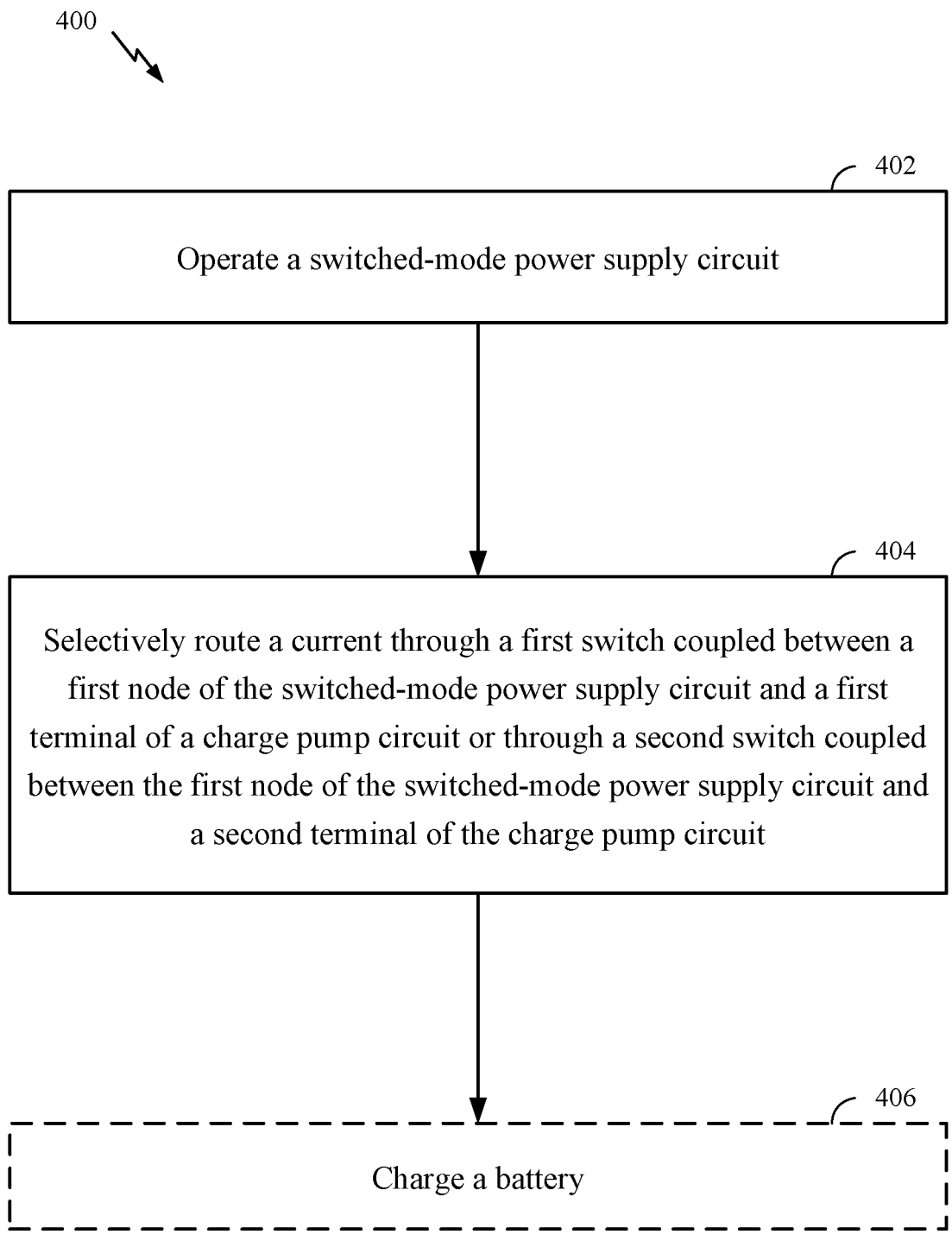
FIG. 4 is a flow diagram of example operations for supplying power, in accordance with certain aspects of the present disclosure.

FIG. 4 is a flow diagram of example operations 400 for supplying power, in accordance with certain aspects of the present disclosure. The operations 400 may be performed by a power supply circuit (e.g., the power supply circuit 250 of FIGS. 2B-2E).

The operations 400 may begin, at block 402, by operating a switched-mode power supply circuit (e.g., the SMPS 260). At block 404, the power supply circuit may selectively route a current through a first switch (e.g., transistor QPH1) coupled between a first node (e.g., the output node 270) of the switched-mode power supply circuit and a first terminal (e.g., coupled to the first power supply node 213) of a charge pump circuit (e.g., the charge pump 214) or through a second switch (e.g., transistor QPH2) coupled between the first node of the switched-mode power supply circuit and a second terminal (e.g., coupled to the second power supply node 215) of the charge pump circuit.

According to certain aspects, the operations 400 may further involve charging a battery (e.g., the battery 230) at optional block 406. In this case, the operating at block 402 may include operating the switched-mode power supply circuit in a forward mode. The battery may comprise multiple cells connected in series. The battery may be coupled to the second switch and to the second terminal of the charge pump circuit.

According to certain aspects, when an input voltage (e.g., $V_{MID}$) at a second node (e.g., the MID node) of the switched-mode power supply circuit is less than a battery voltage (e.g., $V_{BAT2}$) of the battery, the selectively routing at block 404 involves closing the first switch and opening the second switch. In this case where the input voltage at the second node of the switched-mode power supply circuit is less than the battery voltage of the battery, the operations 400 may further include operating the charge pump circuit as a multiply-by-two charge pump from the first terminal to the second terminal of the charge pump circuit.

According to certain aspects, when an input voltage at a second node (e.g., the MID node) of the switched-mode power supply circuit is more than a battery voltage (e.g., $V_{BAT2}$) of the battery, the selectively routing at block 404 involves opening the first switch and closing the second switch. In this case where the input voltage at the second node of the switched-mode power supply circuit is more than the battery voltage of the battery, the operations 400 may further include operating the charge pump circuit as a divide-by-two charge pump from the second terminal to the first terminal of the charge pump circuit.

According to certain aspects, the operations 400 may further involve receiving power to charge the battery via at least one of: a port (e.g., the USB port 202) designated for a wired connection and coupled to the switched-mode power supply circuit or a wireless power transceiver (e.g., the wireless power transceiver 204) coupled to the switched-mode power supply circuit.

According to certain aspects, the operating at block 402 involves operating the switched-mode power supply circuit in a reverse mode, and the selectively routing at block 404 involves closing the first switch and opening the second switch to route the current from the charge pump circuit through the first switch to the switched-mode power supply circuit. For certain aspects, the operations 400 further include operating the charge pump circuit as a divide-by-two charge pump from the second terminal to the first terminal of the charge pump circuit. For certain aspects, the operations 400 further involve receiving power from a battery (e.g., the battery 230). In this case, the battery may include multiple cells connected in series. The battery may be coupled to the second switch and to the second terminal of the charge pump circuit.

According to certain aspects, the operating at block 402 involves operating the switched-mode power supply circuit in a reverse mode, and the selectively routing at block 404 involves opening the first switch and closing the second switch to route the current from a battery through the second switch to the switched-mode power supply circuit. In this case, the battery may comprise multiple cells connected in series. The battery may be coupled to the second switch and to the second terminal of the charge pump circuit.

Example Aspects

In addition to the various aspects described above, specific combinations of aspects are within the scope of the disclosure, some of which are detailed below:

Aspect 1: A power supply circuit comprising: a switched-mode power supply circuit having an input node and an output node; a charge pump circuit having a first terminal and a second terminal; a first switch coupled between the output node of the switched-mode power supply circuit and the first terminal of the charge pump circuit; and a second switch coupled between the output node of the switched-mode power supply circuit and the second terminal of the charge pump circuit.

Aspect 2: The power supply circuit of Aspect 1, further comprising a battery comprising multiple cells connected in series, wherein the second terminal of the charge pump circuit is coupled to the battery.

Aspect 3: The power supply circuit of Aspect 2, wherein the first switch is configured to be closed and the second switch is configured to be open when an input voltage at the input node is less than a battery voltage of the battery.

Aspect 4: The power supply circuit of Aspect 3, wherein the charge pump circuit is configured as a multiply-by-two charge pump from the first terminal to the second terminal of the charge pump circuit when the input voltage at the input node is less than the battery voltage of the battery.

Aspect 5: The power supply circuit of Aspect 2, wherein the first switch is configured to be open and the second switch is configured to be closed when an input voltage at the input node is more than a battery voltage of the battery.

Aspect 6: The power supply circuit of Aspect 5, wherein the charge pump circuit is configured as a divide-by-two charge pump from the second terminal to the first terminal of the charge pump circuit when the input voltage at the input node is more than the battery voltage of the battery.

Aspect 7: The power supply circuit of any of the preceding Aspects, wherein the power supply circuit is configured to be operated in a reverse mode and wherein the first switch is configured to be closed and the second switch is configured to be open in the reverse mode.

Aspect 8: The power supply circuit of any of Aspects 1-6, wherein the power supply circuit is configured to be operated in a reverse mode and wherein the first switch is configured to be open and the second switch is configured to be closed in the reverse mode.

Aspect 9: The power supply circuit of any of the preceding Aspects, wherein the first switch and the second switch comprise n-type metal-oxide-semiconductor (NMOS) transistors.

Aspect 10: The power supply circuit of any of the preceding Aspects, wherein the switched-mode power supply circuit comprises: a first transistor coupled to the input node; a second transistor coupled to the first transistor via a first node; a third transistor coupled to the second transistor via a second node; a fourth transistor coupled to the third transistor via a third node; a capacitive element having a first terminal coupled to the first node and having a second terminal coupled to the third node; and an inductive element having a first terminal coupled to the second node and having a second terminal coupled to the output node of the switched-mode power supply circuit.

Aspect 11: The power supply circuit of Aspect 10, wherein the first, second, third, and fourth transistors comprise n-type metal-oxide-semiconductor (NMOS) transistors.

Aspect 12: The power supply circuit of any of the preceding Aspects, further comprising a parallel charger coupled between the input node of the switched-mode power supply circuit and the second terminal of the charge pump circuit.

Aspect 13: A power management integrated circuit (PMIC) comprising at least a portion of the power supply circuit of any preceding aspect.

Aspect 14: A method of supplying power, comprising: operating a switched-mode power supply circuit; and selectively routing a current through a first switch coupled between a first node of the switched-mode power supply circuit and a first terminal of a charge pump circuit or through a second switch coupled between the first node of the switched-mode power supply circuit and a second terminal of the charge pump circuit.

Aspect 15: The method of Aspect 14, further comprising charging a battery, wherein the operating comprises operating the switched-mode power supply circuit in a forward mode, wherein the battery comprises multiple cells connected in series, and wherein the battery is coupled to the second switch and to the second terminal of the charge pump circuit.

Aspect 16: The method of Aspect 15, wherein when an input voltage at a second node of the switched-mode power supply circuit is less than a battery voltage of the battery, the selectively routing comprises closing the first switch and opening the second switch.

Aspect 17: The method of Aspect 16, further comprising operating the charge pump circuit as a multiply-by-two charge pump from the first terminal to the second terminal of the charge pump circuit when the input voltage at the second node of the switched-mode power supply circuit is less than the battery voltage of the battery.

Aspect 18: The method of Aspect 15, wherein when an input voltage at a second node of the switched-mode power supply circuit is more than a battery voltage of the battery, the selectively routing comprises opening the first switch and closing the second switch.

Aspect 19: The method of Aspect 18, further comprising operating the charge pump circuit as a divide-by-two charge pump from the second terminal to the first terminal of the charge pump circuit when the input voltage at the second node of the switched-mode power supply circuit is more than the battery voltage of the battery.

Aspect 20: The method of any of Aspects 15-19, further comprising receiving power to charge the battery via at least one of: a port designated for a wired connection and coupled to the switched-mode power supply circuit; or a wireless power transceiver coupled to the switched-mode power supply circuit.

Aspect 21: The method of any of Aspects 14-20, wherein: the operating comprises operating the switched-mode power supply circuit in a reverse mode; and the selectively routing comprises closing the first switch and opening the second switch to route the current from the charge pump circuit through the first switch to the switched-mode power supply circuit.

Aspect 22: The method of any of Aspects 14-21, further comprising operating the charge pump circuit as a divide-by-two charge pump from the second terminal to the first terminal of the charge pump circuit.

Aspect 23: The method of any of Aspects 14-22e the battery comprises multiple cells connected in series; and the battery is coupled to the second switch and to the second terminal of the charge pump circuit.

Aspect 24: The method of Aspect 14, wherein: the operating comprises operating the switched-mode power supply circuit in a reverse mode; the selectively routing comprises opening the first switch and closing the second switch to route the current from a battery through the second switch to the switched-mode power supply circuit; the battery comprises multiple cells connected in series; and the battery is coupled to the second switch and to the second terminal of the charge pump circuit.

Aspect 25: A battery charging circuit comprising at least a portion of the power supply circuit of any of Aspects 1-12.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A power supply circuit comprising:
a switched-mode power supply circuit having an input node and an output node;
a charge pump circuit having a first terminal and a second terminal;
a first switch coupled between the output node of the switched-mode power supply circuit and the first terminal of the charge pump circuit; and
a second switch coupled between the output node of the switched-mode power supply circuit and the second terminal of the charge pump circuit.

2. The power supply circuit of claim 1, further comprising a battery comprising multiple cells connected in series, wherein the second terminal of the charge pump circuit is coupled to the battery.

3. The power supply circuit of claim 2, wherein the first switch is configured to be closed and the second switch is configured to be open when an input voltage at the input node is less than a battery voltage of the battery.

4. The power supply circuit of claim 3, wherein the charge pump circuit is configured as a multiply-by-two charge pump from the first terminal to the second terminal of the charge pump circuit when the input voltage at the input node is less than the battery voltage of the battery.

5. The power supply circuit of claim 2, wherein the first switch is configured to be open and the second switch is configured to be closed when an input voltage at the input node is more than a battery voltage of the battery.

6. The power supply circuit of claim 5, wherein the charge pump circuit is configured as a divide-by-two charge pump from the second terminal to the first terminal of the charge pump circuit when the input voltage at the input node is more than the battery voltage of the battery.

7. The power supply circuit of claim 1, wherein the power supply circuit is configured to be operated in a reverse mode and wherein the first switch is configured to be closed and the second switch is configured to be open in the reverse mode.

8. The power supply circuit of claim 1, wherein the power supply circuit is configured to be operated in a reverse mode and wherein the first switch is configured to be open and the second switch is configured to be closed in the reverse mode.

9. The power supply circuit of claim 1, wherein the first switch and the second switch comprise n-type metal-oxide-semiconductor (NMOS) transistors.

10. The power supply circuit of claim 1, wherein the switched-mode power supply circuit comprises:
a first transistor coupled to the input node;
a second transistor coupled to the first transistor via a first node;
a third transistor coupled to the second transistor via a second node;
a fourth transistor coupled to the third transistor via a third node;
a capacitive element having a first terminal coupled to the first node and having a second terminal coupled to the third node; and
an inductive element having a first terminal coupled to the second node and having a second terminal coupled to the output node of the switched-mode power supply circuit.

11. The power supply circuit of claim 10, wherein the first, second, third, and fourth transistors comprise n-type metal-oxide-semiconductor (NMOS) transistors.

12. The power supply circuit of claim 1, further comprising a parallel charger coupled between the input node of the switched-mode power supply circuit and the second terminal of the charge pump circuit.

13. A power management integrated circuit (PMIC) comprising at least a portion of the power supply circuit of claim 1.

14. A method of supplying power, comprising:
operating a switched-mode power supply circuit; and
selectively routing a current through a first switch coupled between a first node of the switched-mode power supply circuit and a first terminal of a charge pump circuit or through a second switch coupled between the first node of the switched-mode power supply circuit and a second terminal of the charge pump circuit.

15. The method of claim 14, further comprising charging a battery, wherein the operating comprises operating the switched-mode power supply circuit in a forward mode, wherein the battery comprises multiple cells connected in series, and wherein the battery is coupled to the second switch and to the second terminal of the charge pump circuit.

16. The method of claim 15, wherein when an input voltage at a second node of the switched-mode power supply circuit is less than a battery voltage of the battery, the selectively routing comprises closing the first switch and opening the second switch.

17. The method of claim 16, further comprising operating the charge pump circuit as a multiply-by-two charge pump from the first terminal to the second terminal of the charge pump circuit when the input voltage at the second node of the switched-mode power supply circuit is less than the battery voltage of the battery.

18. The method of claim 15, wherein when an input voltage at a second node of the switched-mode power supply circuit is more than a battery voltage of the battery, the selectively routing comprises opening the first switch and closing the second switch.

19. The method of claim 18, further comprising operating the charge pump circuit as a divide-by-two charge pump from the second terminal to the first terminal of the charge pump circuit when the input voltage at the second node of the switched-mode power supply circuit is more than the battery voltage of the battery.

20. The method of claim 15, further comprising receiving power to charge the battery via at least one of:
a port designated for a wired connection and coupled to the switched-mode power supply circuit; or
a wireless power transceiver coupled to the switched-mode power supply circuit.

21. The method of claim 14, wherein:
the operating comprises operating the switched-mode power supply circuit in a reverse mode; and
the selectively routing comprises closing the first switch and opening the second switch to route the current from the charge pump circuit through the first switch to the switched-mode power supply circuit.

22. The method of claim 21, further comprising operating the charge pump circuit as a divide-by-two charge pump from the second terminal to the first terminal of the charge pump circuit.

23. The method of claim 21, further comprising receiving power from a battery, wherein:
the battery comprises multiple cells connected in series; and
the battery is coupled to the second switch and to the second terminal of the charge pump circuit.

24. The method of claim 14, wherein:
the operating comprises operating the switched-mode power supply circuit in a reverse mode;
the selectively routing comprises opening the first switch and closing the second switch to route the current from a battery through the second switch to the switched-mode power supply circuit;
the battery comprises multiple cells connected in series; and
the battery is coupled to the second switch and to the second terminal of the charge pump circuit.

* * * * *